Aug. 18, 1931.   H. J. STEGEMAN ET AL   1,819,133
LAWN MOWER
Filed April 8, 1925   6 Sheets-Sheet 1

Fig. 1

INVENTORS
Henry J. Stegeman
BY   and Sylvanus D. Locke
Chamberlain & Newman ATTORNEYS.

Aug. 18, 1931. H. J. STEGEMAN ET AL 1,819,133
LAWN MOWER
Filed April 8, 1925 6 Sheets-Sheet 2

INVENTORS
Henry J. Stegeman
BY and Sylvanus D. Locke
Chamberlain & Newman ATTORNEYS.

Aug. 18, 1931.   H. J. STEGEMAN ET AL   1,819,133

LAWN MOWER

Filed April 8, 1925   6 Sheets-Sheet 6

INVENTORS
*Henry J. Stegeman,*
*and Sylvanus D. Locke*
BY *Chamberlain & Newman* ATTORNEYS.

Patented Aug. 18, 1931

1,819,133

UNITED STATES PATENT OFFICE

HENRY J. STEGEMAN, OF FAIRFIELD, AND SYLVANUS D. LOCKE, OF BRIDGEPORT, CONNECTICUT, ASSIGNORS TO THE LOCKE STEEL CHAIN COMPANY, OF BRIDGEPORT, CONNECTICUT, A CORPORATION OF CONNECTICUT

LAWN MOWER

Application filed April 8, 1925. Serial No. 21,470.

The present invention relates to a lawn mower, and more particularly to the type employing motive power as a propelling means, and adapted to be steered, and controlled as to speed by an operator who walks behind it.

In all lawn mowers which have come to our attention, gauge rolls are provided both in front and rear of the cutting mechanism and the tread of these gauge rolls are of a greater width than the swath cut by the blades. The faces of the front gauge rolls are relatively narrow.

The result is that the rolls which are of a tread wider than the swath cut by the blades and those in front of the cutting mechanism necessarily run over un-cut grass, rolling it down so flat that the stationary blade of the cutting mechanism cannot get under all of it even if the succeeding cut is made in the opposite direction and over-laps the preceding cut. The result is a different shading in each alternate swath of freshly cut lawn and ridges of un-cut grass when the rolled down grass straightens up. The rollers with the narrow faces will cut ruts in new lawns or lawns that are soft from much rain. This method of support does not permit cutting close to the edge of a drive-way or path as the cutting mechanism will dig into the ground when the gauge wheel on one side drops over the edge of the lawn. The tread of the gauge wheels being wider than the cutting mechanism prevents cutting the grass close to buildings, trees or other obstructions.

It is, therefore, the principal object of the present invention to provide a mower that will obviate these difficulties, and to this end an important feature consists in making the cutting blades of a width greater than that of the supporting and gauge rollers, eliminating the front gauge wheels of the conventional mower, and making the stationary cutting member into a wide shoe which slides over the cut grass, carrying all of the weight of the cutting mechanism or the front end of a power mower or carrying part of this weight in conjunction with the rear gauge roll.

A further object of the invention is to provide improved clutch and brake control by means of which the motor driven machine may be started and stopped, and which are so correlated that neither the clutch nor the brake may be operated while the other is in operation—that is the clutch will be immediately thrown out or disengaged as the brake is applied and the brake will be immediately disengaged or released as the clutch is applied.

It is further proposed to provide a single manual control for the clutch and brake by means of which the operator may operate them both with one hand and control the motor with the other, without relinquishing his grip on the handles with which he guides the mower.

A further object is to provide an improved clutch means for connecting and disconnecting the cutting blades from the motor, and whereby the machine may be driven either with or without the blades being in operation, and further to provide such clutch means which will automatically compensate for any obstruction to the operation of the cutting blades, as engagement therein of sticks or pebbles, so that there is no danger of such stoppage being transmitted to the other operative parts of the machine which might otherwise be damaged thereby, and to provide a suitable clutch for the propelling mechanism by which the same can be started in a very gradual but positive manner and stopped the same way, and of such a construction that it does not require accurate and frequent adjustment.

A further object is to provide a cutting blade mechanism which may be adjusted as to its relation with the ground, being either entirely disengaged therefrom, as for instance when the machine is being conveyed from one place to another, or over pebbly ground, or may be engaged at different cutting distances from the ground, so that either a fine or coarse cut may be made. This is accomplished by overhanging the cutting mechanism in front of two supporting rolls and providing means for changing their relative vertical distances from a horizontal plane.

Where the gauge roll immediately in the rear of the cutting mechanism is dispensed with, or relieved from carrying any weight and the whole weight of the machine is carried on the propelling roll and the shoe under the cutting mechanism, it is necessary to provide other means for cutting the grass at various heights as may be desired. This we accomplish by providing different thicknesses of shoes, or by furnishing packing strips, or shims, to place between the shoe and the stationary cutting blade.

It is also necessary that either the driving roll or the mower should be mounted flexibly, transversely, to better conform to uneven contour of the ground, and insure good traction for the driving roll, and a uniform length of cut for the entire width of the cutting blades. For this purpose we provide a longitudinal pivot between the cutting mechanism and the frame carrying the main propelling roll.

The usual method of adjusting the contact between the stationary and rotary cutting blades is by means of screws, which, when turned in one direction bring the blades closer together, and when turned in the other directions separate the blades. As a fine contact between blades is necessary and a very slight turn of the screws make a very large adjustment, it is difficult to bring the cutting members into proper contact relations. For the purpose of this adjustment we provide an eccentric, of comparatively little eccentricity, a considerable turn of which is required to make a slight change in the space between the two cutting members.

An attachable grass catcher is provided which when full can be lifted off and dumped by hand, or the machine can be run to a convenient place and the basket dumped by the operator by means of a convenient cord without leaving the control end.

With these and other objects in view, an embodiment of the invention is shown in the accompanying drawings, and this embodiment will hereinafter be more fully described with reference thereto, and the invention will be finally pointed out in the claims.

In the drawings:—

Similar reference characters indicate corresponding parts throughout the several figures of the drawings.

Referring to the drawings, the mower according to the present embodiment of the invention comprises a horizontally disposed rectangular angle-iron frame 10 provided at its rear and at each side with upwardly and rearwardly extending operating handle portions, each comprising angle iron bars 11 and 12 bolted at their lower ends to the side pieces of the frame 10 and bolted at their upper converging ends to the flange portions 13 of tubular members 14, in each of which a handle or grip 15 is rotatably engaged and projects rearwardly.

A gasoline internal combustion motor 17 is mounted substantially centrally of the frame 10. The front end of the motor is carried by the supporting bracket 16 which is mounted on a cross member of frame 10. The rear of the motor is mounted on a cross member between handle portions 12. Upon this same cross member is carried a frame 19 which supports the gasoline tank 18 above the motor.

The speed of the motor is adapted to be controlled by the left-hand handle 15, and for this purpose this handle is eccentrically connected at 20 to a flexible control wire 21 which extends through a metal tube 22 to the carbureter control of the engine. In this respect the control of the engine is substantially the same as that of a motorcycle. The driving shaft of the motor is connected by a flexible connection 23, consisting of opposed discs at each side of said flexible connection and respectively connected at alternate spaced points to an intermediate flexible disc or discs, to a propeller shaft 24 journaled at its outer end in the upper bearing portion 25 of a triangular standard 26 bolted to the side of the frame 10.

At each side and rearwardly of the frame 10 there are supported bearing hangers 27 and 28 adjustably secured to the frame by bolts 29 and in which the axle ends of the main supporting rollers of the machine are engaged, as will be hereinafter more fully pointed out.

At the forward end of the frame 10 there is mounted the supporting frame 30 for the cutting mechanism. This frame is adapted for pivotal movement to position the cutting blades at different distances from the ground, and pivotally supports the cutting mechanism on a longitudinal pivot so that it may have a transverse rocking movement to follow the contour of the ground over which the mower passes.

The supporting frame 30 is formed of angle iron and is mounted within the frame 10 by means of square flanged pivot blocks 31 rotatably supported at each side of the frame 10 upon a rod 31ª headed at its outer end and provided with a nut at its inner end, and having a spring 31ᵇ thereon between the nut and the pivot block 31, said block being slidably engaged in slots 32 in the sides of the frame 30 whereby said frame is adapted to be swung about the rods 31ª as pivots and shifted in relation thereto. The two sides of the frame 30 project rearwardly of the rearward cross member of the supplemental frame and are pivotally connected to lever arms 33 provided at each end of a shaft 34 rotatably supported in suitable bearing brackets 35 secured at each side of the frame 10 and slightly to the rear of the center, said shaft extending transversely across the frame 10 and having connected at one end adjacent the side of said frame an upwardly extending arm 36 to which there is pivotally connected a locking grip lever 37 having its toothed end 38 normally engaged between two of the teeth 39 of a segmental locking bar 40 bolted to the frame 10.

Figure 1:
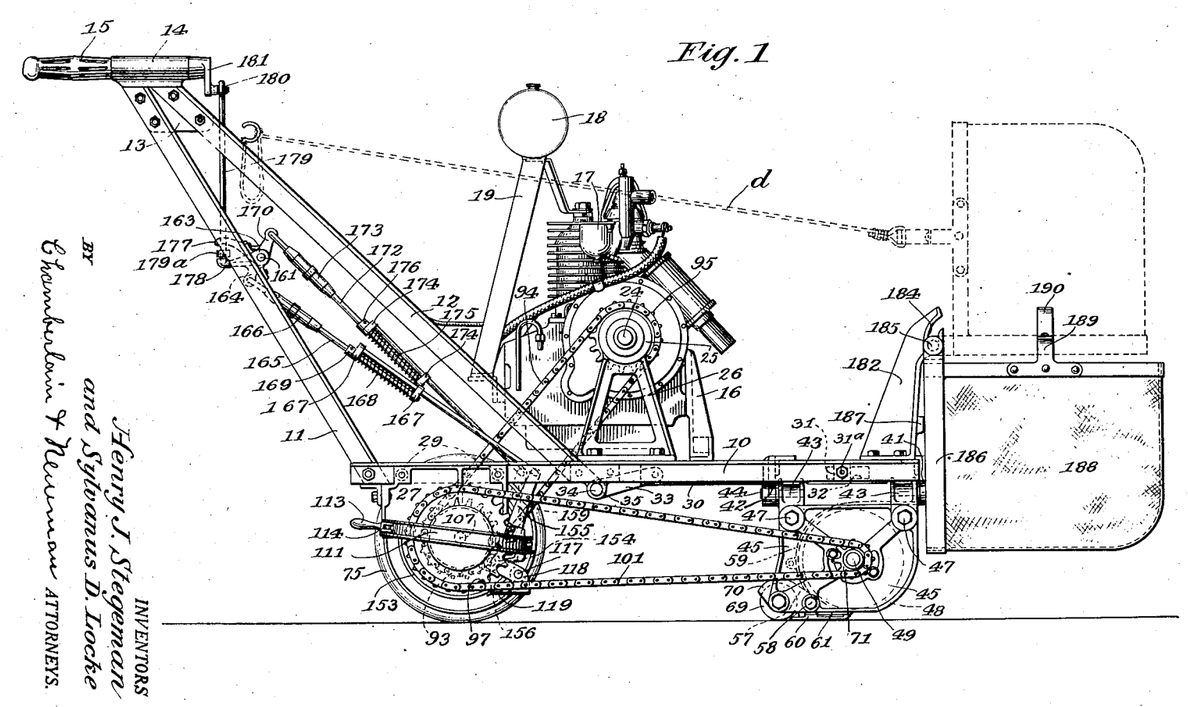
Fig. 1 is a side elevation of the mower according to the present invention, showing the same from the right-hand side, with the grass receiving basket in place, and with the cutting blade mechanism in operative position.
Figures 7, 12:
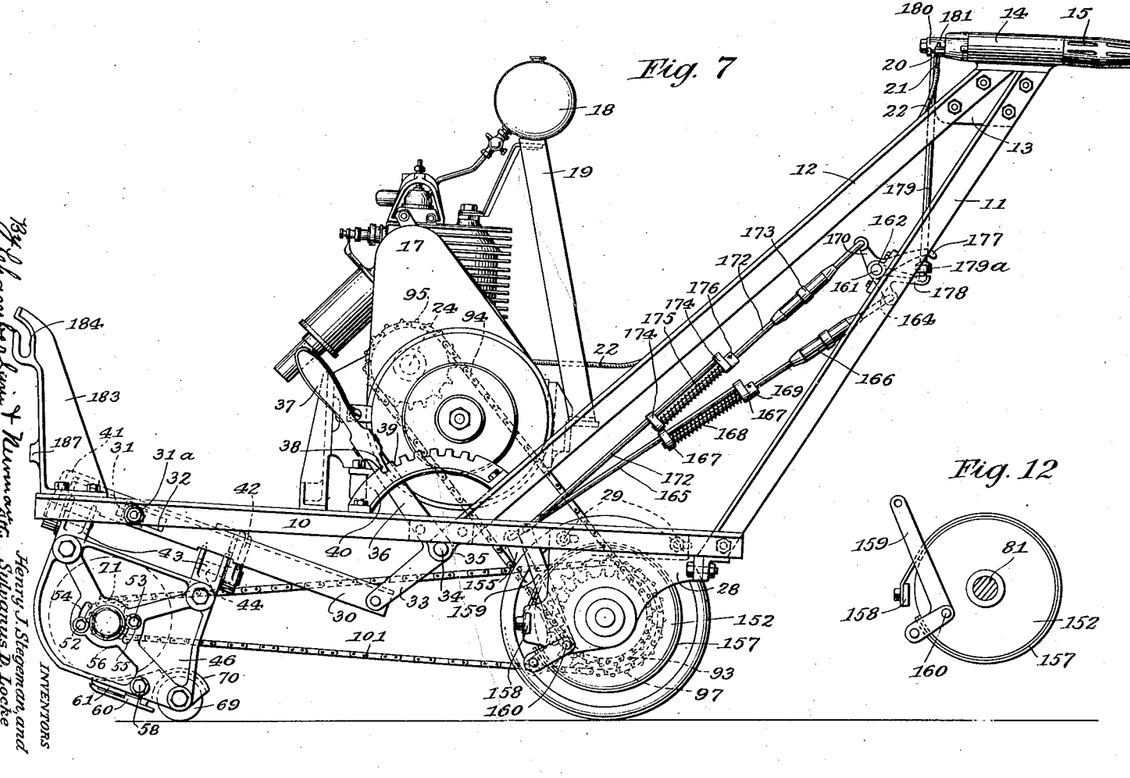
Fig. 7 is a side elevation of the mower from the left-hand side, and showing the cutting blade mechanism in the inoperative or raised position.
Fig. 12 is a detail elevational view of the brake mechanism used in the end of the roll.
Figure 8:
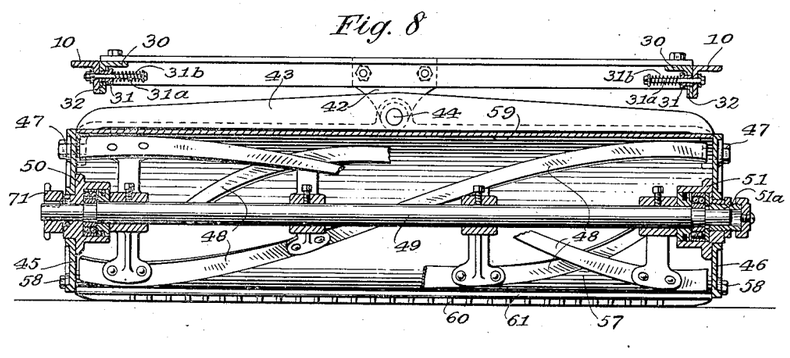
Fig. 8 shows an enlarged central vertical longitudinal section taken through the axis of the rotary cutting element and the frames supporting same.
Figure 9:
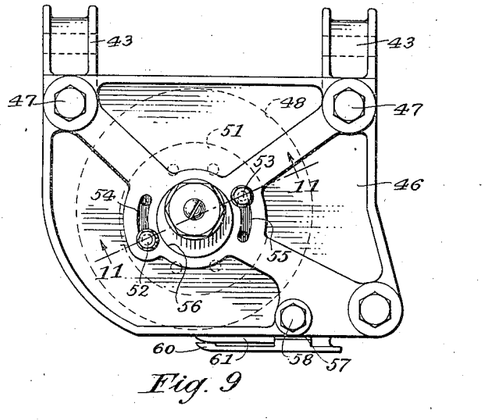
Fig. 9 is an enlarged side view of supplemental frame carrying cutting elements.
Figure 10:
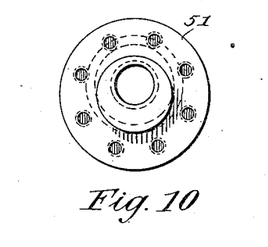
Fig. 10 is a detached side view of one of the eccentric bearing members adapted for adjustable attachment to the cutter frame.
Figure 11:
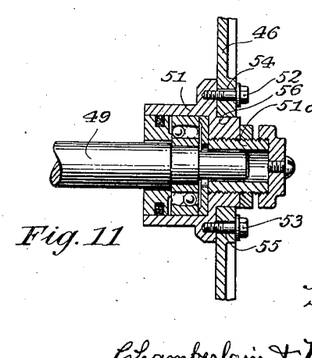
Fig. 11 is an enlarged sectional view taken through the cutter frame, adjustable bearing and cutter shaft on line 11—11 of Fig. 9.

It will thus be seen that by shifting the lever 36 from one extreme position to the other the frame 30 will be moved from a position in a plane parallel with the frame 10, and as shown in Fig. 1, to a position angularly disposed with relation to the frame 10, and as shown in Fig. 7 without changing the distance between the center of the driving sprocket and the center of the driven sprocket, and that in the intermediate positions the angularity of the frame 30 may be of any desired degree, depending upon the particular requirements.

As will presently more fully appear the cutting blades are so mounted upon the frame 30 that in the horizontal position of the frame the blades are at the lowest position with respect to the ground while in the position of greatest angularity, the blades are at the highest raised position with respect thereto.

Centrally of the two transverse members of the frame 30 there are respectively secured longitudinally aligned depending bearing brackets 41 and 42 in which there is pivotally mounted the frame for the cutting blades, this frame consisting of a pair of transverse parallel upper frame members, 43 provided centrally with trunnions 44 engaging the brackets 41 and 42, whereby the frame is adapted to swing upon an axis in line with the line of travel of the machine, and side portions 45 and 46 bolted as at 47 to the ends of the members 43. The rotary knives 48 are of the well known spiral type and are secured to a shaft 49 journaled at its ends in eccentric bearing members 50 and 51, which are adjustably fixed in the sides 45 and 46 of the frames by means of bolts 52 and 53 engaged in circumferentially disposed slots 54 and 55, adapted to permit of adjustment of the rotary blades relatively to the stationary blade, presently to be described, and which latter is supported upon the frame to cooperate with the blades 48. The frame sides 45 and 46 are further provided with central openings 56 through which the hubs of the eccentric bearing members project for rotary movement in relation to the said side members. These eccentric bearing members are further provided with dust-proof caps and ball bearings in which the ends of the shafts 49 are rotatably mounted. The bearing member 51 is further provided with a sleeve 51ª which is threadably positioned in the internally threaded portion of the bearing and is secured by means of a lock-nut on said sleeve and positioned against the end of the hub portion of the bearing. This sleeve is made sufficiently large to form an oil pocket for the shaft bearing which pocket is enclosed by a cap threadably attached to the end of the said sleeve.

Between the side frames 45 and 46 and rearwardly and at the lower side of the cutting blades there is supported a transversely disposed cross bar 57 secured at its ends to the side frames by means of bolts 58, the forward surface of this bar being substantially concentric with the periphery of the cutting blades. A shield member 59 may be employed between the side frames and extended circumferentially in spaced relation about the rearward side of the cutting blades and in a tangential line above the same where it is secured to the forward cross frame portion 43. This shield is adapted to direct the cut grass forwardly to a suitable receptacle, hereinafter to be described and may be removed when the basket is not used.

Figure 5:
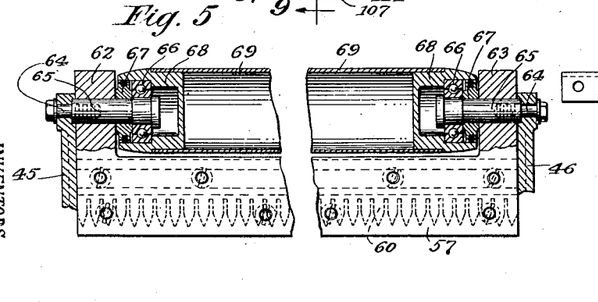
Fig. 5 is a horizontal section, partly in plan of the grass engaging shoe of the blade mechanism, and the front supporting roller.
Figure 6:
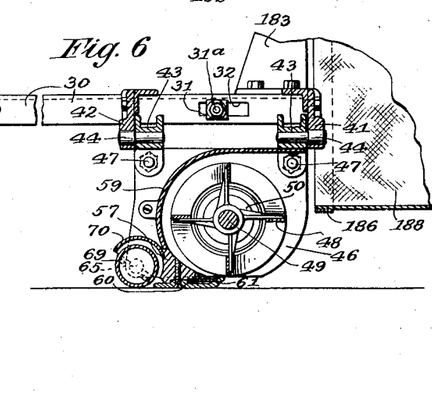
Fig. 6 is a vertical sectional view along the line 6—6 of Fig. 4.

To the under side of the cross bar 57 there is secured a stationary blade member 61 adapted to cooperate with the spiral cutting blades 48 to cut the grass. A ground engaging gauge shoe 60 preferably toothed as indicated in Fig. 5 is also detachably secured to the underside of the cross bar 57 and beneath the cutting blade. The cross bar 57 is provided at each end with rearwardly projecting apertured extensions 62 and 63 which are secured to the side frames 45 and 46 by means of bolts 64 at each side, and each engaging a bearing pin 65 provided at its inner end with a rotatable bearing member 66 and a dust proof bearing collar 67 disposed between the bearing and the inner side of the extension, and upon which there is rotatably mounted a recessed end member 68 provided in each end of a cylindrical roller 69 adapted to engage the ground behind the shoe 60 during the operation of the mower, and to engage the ground as a rolling support in the inoperative position as shown in Fig. 7, and adapted to be held in any intermediate position when it is desired to use this roll as a gauge roll to vary the height at which the grass is to be cut. A curved shield 70 is secured to the cross bar 57 and extends partially about the upper portion of the roller. Upon one end of the shaft 49 there is secured a sprocket 71 adapted to be driven by a driving mechanism hereinafter to be more fully described.

The gauge shoe 60, which may be adjusted toward or away from the bar 57 by means of suitable spacing means (not shown), is adapted to regulate the length of the grass left standing, and supports the weight of the forward part of the machine during the mowing operation, being preferably made of anti-friction polished metal for this purpose. Instead of adjusting the shoe, a number of interchangeable shoes of different depths may be provided with each machine, a large depth shoe being used for coarse mowing, while a small depth shoe is used for fine mowing.

The main supporting rollers 75 and 76 are of barrel form and of a width less than that of the cutting blades so that they follow the cutting blades entirely within the swath cut thereby. The rollers are of hollow construction and include hub portions 77 and 78, supported axially by web or spoke structures 79 and 80 and mounted upon shaft 81; the shaft 81 being connected by suitable clutch mechanism to driving means and keyed to a differential mechanism which in turn drives the rolls 75 and 76.

The shaft 81 is provided at its end with an anti-friction bearing unit 83 of the ball type, the inner ring of which is secured to the end of the shaft by a retaining nut 84 while the outer ring is secured within a tubular shaft 85 against a shoulder 86 therein by means of a nut 87 screwed into the end of said tubular shaft. The tubular shaft 85 is rotatably supported within an opening 88 of the hanger 27 by means of a ball bearing unit 89, the inner ring of which is secured against a shoulder 90 of said tubular shaft by means of a retaining ring 91, while the outer ring is secured within the opening 88 of the hanger by means of a ring 92. Intermediate the end of the tubular shaft 85 there is secured a large sprocket gear 93 connected by a sprocket chain 94 to a sprocket gear 95 secured upon the propeller shaft 24 of the engine. Upon the outer end of the shaft 85 there is provided a shouldered bearing portion 96 upon which there is rotatably mounted a sprocket gear 97 supported between pressure discs 98 and 99 at each side slidingly mounted upon keys 98' in the bearing portion 96 of the tubular shaft, flexible washers 100 being disposed between the inner surfaces of said discs and the outer surfaces of the gear. The sprocket gear 97 is connected by a sprocket chain 101 to the sprocket pinion 71 of the cutting blades and is adapted to be connected by a clutch mechanism, presently to be described, to the tubular shaft 85, the yieldable mounting of the gear being such that when the clutch is connected during the operation of the mower, the driving shaft may rotate relative to the gear in the event that any obstruction prevents the proper operation of the cutting blades, so that there is no chance of any of the parts becoming jammed or broken.

Figure 13:
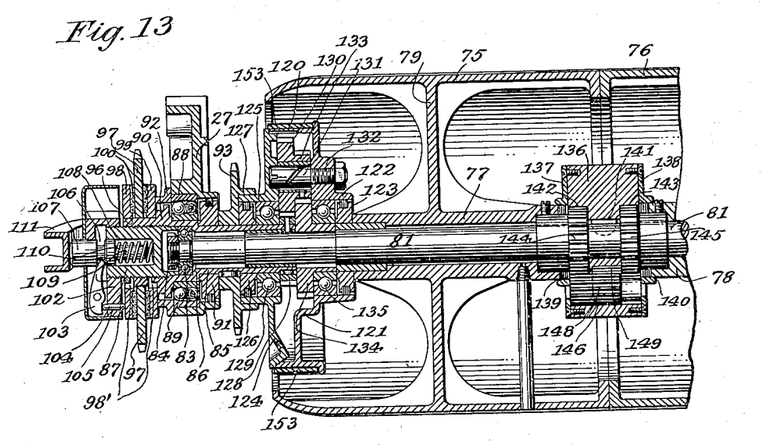
Fig. 13 is an enlarged detail sectional view, taken along the line 13—13 of Fig. 4 and showing the clutch, drive, and differential mechanism.

The clutch mechanism consists of a pinch collar 102 screwed upon the projecting end portion of the nut 87 and provided with three radially disposed pivotally mounted clutch fingers 103 only one of which is shown (see Fig. 13) having their short arms pressing upon a pressure pin 104 slidably mounted in a passage 105 of the pinch collar and pressing at its inner end upon the disc 98 and having its long arm engaged in an annular groove 106 of a plunger 107 slidably mounted in an axial cylindrical pocket 108 provided in the end of the nut 87, a spring 109 being provided upon the shank 110 of said plunger within the socket and normally pressing the same outwardly to rock the finger 103 so that it presses the pin 104 inwardly against the disc 98 and thereby forms a driving connection between the shaft 85 and the gear 97. The clutch is adapted to be operated by means of a pivoted yoke member 111 pivotally mounted at one end upon the bracket 27 at 112, and connected at its other end to an eccentric lever device consisting of a handle 113 pivoted upon the end of a bolt 114 secured in the side of the bracket 27 and extending through an opening in the end of the yoke member, said handle being provided with an eccentric cam portion 116 adapted in one position of the handle to allow the yoke member to swing outwardly so that the plunger 107 is free to move to its outward position to connect the clutch, and adapted in the other position to swing the yoke member inwardly to press the plunger 107 inwardly against the pressure of the spring 109 and thereby rock the finger 103 to such position that the pressure pin 104 is released and the gear 97 thereby disconnected from the driving shaft 85. This member 111 also acts as a guard for the clutch it being of such a shape that in running close to an obstruction such as a post or tree, the machine will be pushed to one side by a gentle sweep of the arm and if the pressure be great enough will release the driving sprocket 97.

Figures 14, 15:
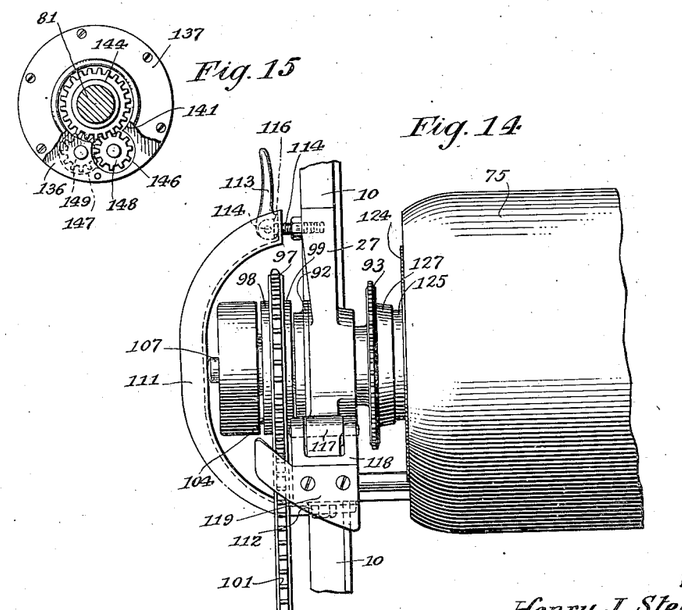
Fig. 14 is a bottom plan view of the structure shown in Fig. 13.
Fig. 15 is a detail end view, with parts broken away, of the differential mechanism.

At the underside of the hanger 27 there is provided a bearing portion 117 (Fig. 14) upon which there is mounted a bracket 118 carrying a guard 119 which projects beneath the sprocket chain 101 adjacent the sprocket gear 97 to prevent long grass from becoming tangled in the chain and gear. This guard is essential on the outside of the machine which is likely to come in contact with long grass on the edge of the lawn, the surface and edges of the guard being so shaped that it bends the long grass downward and sweeps it outward so that it cannot be picked up and compacted in the teeth of the sprocket gear.

At the inner end of the tubular driving shaft 85 there is provided a planetary gearing and clutch mechanism adapted to connect the shaft 81 thereto. This mechanism consists of a hollow drum 120 integrally formed upon a plate 121 having a hub portion 122 rotatably mounted upon bearing 135 which bearing is mounted upon hub of gear 134, said drum having a cover plate 124 secured upon its outer end provided with a hub portion 125 rotatably mounted upon a bearing 129 mounted upon the driving shaft 85 adjacent the sprocket 93 and said sprocket 93 being provided with an integral flange 127 annularly surrounding the hub 125. At the inner end of the driving shaft 85 there is splined a pinion 128 and between this pinion and the dust proof bearing collar 126 there is provided an anti-friction bearing unit 129 of the ball type, the inner ring of which is mounted upon said shaft while the outer ring is secured within the hub 125 of the drum. The pinion 128 meshes with the large diameter gear portion 130 of a combination pinion gear rotatably mounted upon a stud shaft 131 secured in a boss 132 of the plate portion 121, and the small diameter gear portion 133 of which meshes with a spur gear 134 splined upon the shaft 81. Between the hub of this gear 134 and the hub 122 of the drum there is provided an anti-friction bearing unit 135 of the ball type, the inner ring of which is mounted upon the hub of the gear while the outer ring is mounted within the hub of the drum. In order to connect the clutch to effect driving of the shaft 81 from the shaft 85 the drum 120 is adapted to be held stationary by means of a suitable brake band, presently to be described, the shaft 131 of the planetary transmission gears 130 and 133 being thereby held stationary so that the gear 134 is driven from the shaft 85. Upon the release of the brake drum the same is rotated about the gear 134, which remains stationary, so that the shaft 81 and the roller 75 are not driven. This type of clutch is very desirable as the pressure on the band can be applied very gradually and propelling the machine by a gentle acceleration which eliminates jumping with its accompanying uneven cut of grass.

The differential mechanism between the drums 75 and 76 consists of a differential housing 136 keyed to the shaft 81 and having flanged end plates 137 and 138 secured thereto to hold gears 148 and 149 in place. The housing is provided with a central opening 141 and keyway through which passes shaft 81 with a Woodruff key inserted to lock the housing to the shaft. At the ends of said central opening there are formed annular recesses 142 and 143 within which the gears 144 and 145 secured within the respective hubs 77 and 78 are engaged. The housing is further provided at one side with a cylindrical pocket 146 extending partially therethrough from one side, and having an opening between it and the recess 142, and at the other side with a similar cylindrical pocket 147 extending partially therethrough from said other side, and having an opening between it and the recess 143, and also having an opening between it and the pocket 146. Within the pockets 146 and 147 there are rotatably mounted elongated pinions 148 and 149 meshing with each other at their inner ends between the gears 144 and 145, and respectively meshing with said gears at their outer ends.

In operation, the differential mechanism compensates for any variation in the speed of rotation of the rollers 75 and 76, as when turning corners, or encountering unequal resistance, so that there is no tendency to drag upon the lawn, and the machine may be steered with the greatest freedom.

The end of the shaft 81 is provided with a dust proof bearing collar 150 and carried upon a ball bearing having bearing in an opening 151 of the hanger 28, and between this collar and the hub 78 of the roller 76, there is splined upon the said shaft a brake drum, 152 which is engaged by a brake band, presently to be described, for the purpose of retarding or stopping the movement of the machine as in stopping on grades.

According to the invention the means for operating the brake band 157 for the brake drum 152 and the means for operating the clutch band 153 for the planetary drive gearing is such that neither can be operated while the other is in operation, the brake band being released whenever the clutch band is applied and the clutch band being released whenever the brake band is applied. The bands at each side are of similar construction and are supported upon the hangers 27 and 28, the band 153 for the clutch being fixedly supported at one end by means of a bracket 158 secured to the hanger 27 and is connected at its other end to a bell-crank 155 pivotably mounted at 154 upon the hanger 27, while the band 157 for the brake drum is fixedly supported at one end by means of a bracket 158 secured to the hanger 28, and is connected at its other end to a bell-crank 159 pivotably mounted at 160 upon the hanger. A transversely disposed rocker shaft 161 is rotatably mounted in bearing brackets 162 and 163 upon the angle bars 11 of the handles and upon one end of the shaft 161 there is loosely mounted a bell-crank 164, one arm of which is connected by a yieldable connecting rod 165 to the bell-crank 155 of the clutch mechanism, said rod including a turnbuckle 166 for longitudinal adjustment and a sliding yieldable connection intermediate its ends consisting of collars 167 secured upon the respective ends of the two parts of the rod and having openings through which the other part of the rod is slidably engaged, a spring 168 being mounted upon the upper part of the rod and interposed between the collars 167. A fixed collar 169 on the upper part of the rod limits the contractive movement.

Figure 2:
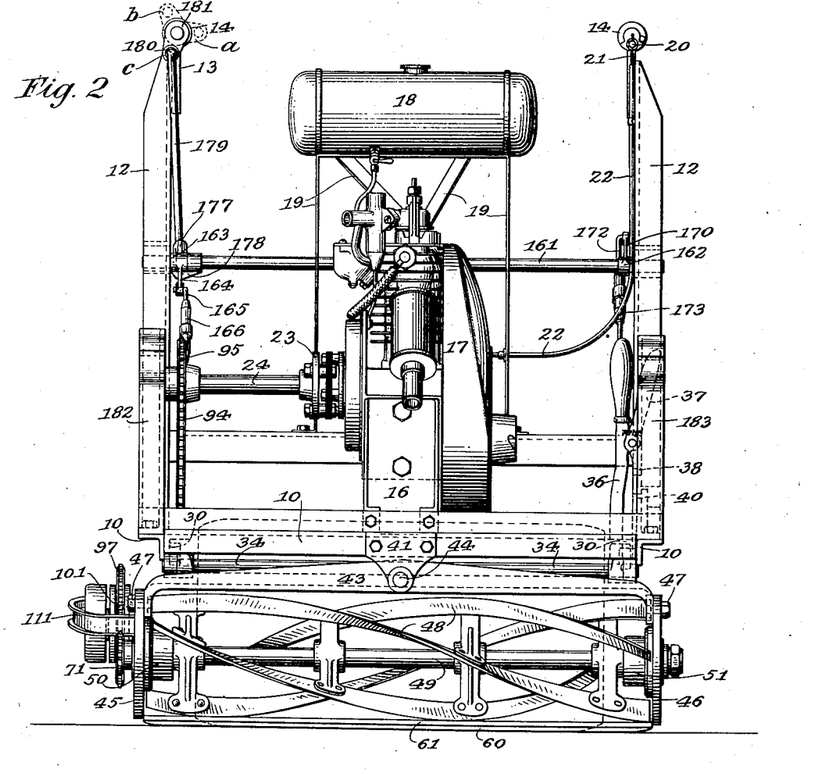
Fig. 2 is a front elevation thereof, the basket being removed.
Figure 3:
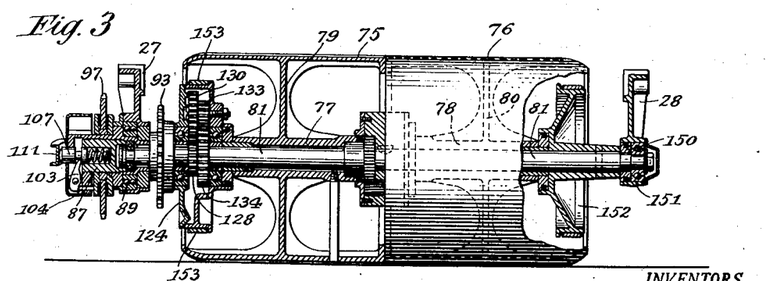
Fig. 3 is a detail view, partly in front elevation and partly in longitudinal section of the supporting rollers, and clutch, drive, and brake mechanism therefor.
Figure 4:
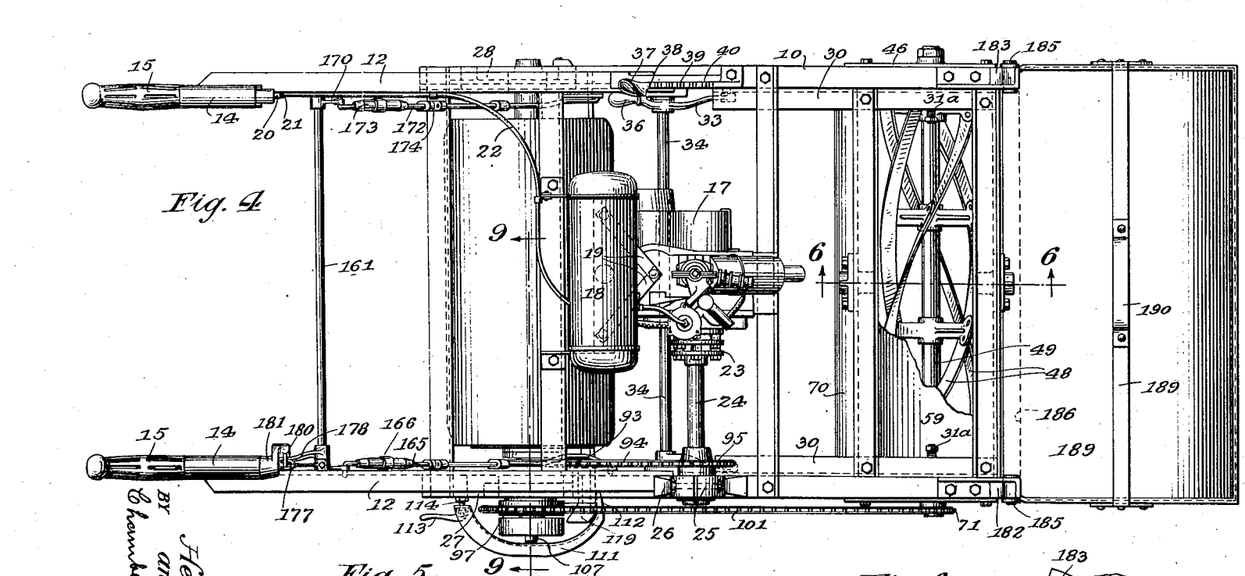
Fig. 4 is a top plan view of the mower.

Upon the other end of the rocker shaft 161 there is secured a lever arm 170 extending in diametrically opposed direction to the loosely mounted bell-crank arm 164 and connected by a connecting rod 172 to the bell-crank 159 of the brake drum band. This connecting rod 172 is similar in construction to the connecting rod 165 consisting of two parts slidably and yieldably connected with each other and including a turnbuckle 173, apertured collars 174, a spring 175, and a fixed collar 176 upon the upper portion of the rod. Adjacent to the rearwardly projecting forked arm 177 of the bell-crank 164 there is secured to the shaft 161 a rearwardly projecting arm 178 that is engaged by the rod 179 for the purpose of rocking the shaft 161 and operating the brake. The rod 179 passes through the forked end of the lever arm 177 and is slidably engaged at its lower end in the end of the arm 178, an enlargement 179ª being provided on the rod so that upon upward movement of the rod 179 the bell-crank 164 (Fig. 7) is rocked in counter-clockwise direction and upon downward movement the arm 178, the rock shaft, and the arm 170 are rocked in clockwise direction. The rod 179 is pivotally connected at its upper end 180 to an arm 181 secured upon the forward end of the right-hand handle 15 rotatably mounted in the tubular bearing member 14. The respective bands are adapted to be operated by turning this handle 15 a quarter turn in one or the other direction from the normal position of arm 181 as indicated by dotted line $a$ (see Fig. 2). Rotation of the handle from this dotted position to the $c$ position causes the rocker shaft 161 to be rotated in a direction to pull the rod 172 to apply the brake band, whereas rotation of the handle in the opposite direction, to the dotted position $b$ of arm 181, operates the lever 164, which is loose upon the rocker shaft, pulls the rod 165 to apply the clutch band, so that the clutch band is applied and the brake band is released. From the foregoing it will be seen that when the arm 180 is positioned either as seen in full lines $c$ or as indicated by dotted lines $b$, in Fig. 2 it is thrown past its center with the rod 179 against the frame and thereby forms a lock to hold the brake and clutch until manually released by rotary movement of handle 15.

At the forward end of the main frame of the machine at each side there are secured upwardly extending standards 182 and 183 provided with pockets 184 at their upper ends in which the trunnions 185 provided at each side and at the upper rearward corners of a basket frame 186 are rotatably engaged. The frame normally rests against stops 187, in which position the basket 188 secured to the same is adapted to receive the cut grass thrown by the cutting blades and directed into the basket by the guard 59. A cross member 189 is secured at its ends to the top portion of the frame and is provided centrally with the handle 190 for the purpose of removing the basket from the mower or swinging it, as shown by the dotted line, Fig. 1, for the purpose of emptying the grass therefrom. One end of a rope $d$ may be tied to this handle and the other end carried to the control handles so that operator can dump the grass without leaving the control.

The mower, according to my invention, is adapted to be efficiently operated under practically all conditions, and upon lawns of varying contours and shapes, to cut the grass cleanly and uniformly, while being always under the positive control of the operator, who may guide and control it with very little manual effort. It will cut closely to walls, flower beds, rocks and other obstructions in the lawn, and the mowed lawn will be free of streaks between the swaths.

It will also be observed that the machine is so constructed and proportioned as to be balanced with respect to the center of gravity that the cutting blades will engage the grass without impeding the progress of the machine and the operator may grip the handles to steer and control the machine without the necessity of exerting any pressure to maintain the machine in proper engagement with the ground.

The novel clutch and brake control permits it to be safely operated on terraces, and the blade arrangement is such that it will not dig into the edge of the terrace, as has been the case with other types of mowers. The machine is at all times under the control of the operator, who may steer it, stop or start, increase or decrease its speed, tip or lift it over obstructions by hand, or pull it backwards, without letting go the handles.

The blade driving clutch mechanism is such that the drive will only carry a predetermined load, and if by accident a stick or stone should get into the blades the clutch will slip, so that there is no danger of stalling the engine, or breaking any part of the machine.

We have illustrated and described a preferred and satisfactory embodiment of the invention, but it will be obvious that changes may be made therein within the spirit and scope thereof and that some of the novel features herein described are equally applicable to a hand mower, and whereby the rolling down of the grass by that class of machines may be avoided, as defined in the appended claims.

Having thus described our invention, what we claim and desire to secure by Letters Patent is:—

1. In a power driven lawn mower, a motor, a cutting mechanism, means for connecting the cutting mechanism to the motor, a rearward rotary propelling and supporting mechanism, means to connect the power of the motor to the propelling and supporting mechanism, a control lever to make and break this connection, a brake to retard the motion of the propelling mechanism, a brake lever to apply and release the brake, the control lever moving in one direction to connect the motor to drive the propelling mechanism and release the brake, and moving in the opposite direction to disconnect the motor and apply the brake.

2. In a motor driven lawn mower, the combination of a main frame, propelling mechanism carried thereby, cutting mechanism at the forward end of said main frame, a supporting roller mounted on said frame rearwardly of the cutting mechanism, drive means between said propelling mechanism and said supporting roller, drive means between said propelling mechanism and said cutting mechanism for operating the latter, clutch means for said first drive means, a brake for said roller, and hand operated unitary means for individually operating said clutch means and brake whereby as one is released the other is engaged.

3. In a motor driven lawn mower, the combination of a main frame, propelling mechanism carried thereby, cutting mechanism at the forward end of said main frame, a supporting roller mounted on said frame rearwardly of the cutting mechanism, drive means between said propelling mechanism and said supporting roller, clutch means for said drive means including a clutch drum at one end of said roller, a brake drum, a clutch band and a brake band on said respective drums and hand operated unitary means for individually operating said respective bands whereby as one is released the other is engaged, and drive means between said propelling mechanism and said cutting mechanism to operate the latter.

4. In a motor driven lawn mower, the combination of a main frame having handles, propelling mechanism carried thereby, cutting mechanism at the forward end of said main frame, a supporting roller mounted on said frame rearwardly of the cutting mechanism, drive means between said propelling mechanism and said supporting roller, means for connecting said cutting mechanism to said drive means, clutch means for said drive means including a clutch drum, a brake drum, a clutch band and a brake band on said respective drums, a rotatable hand grip in one of said handles, and means operatively connecting said grip to said bands adapted as the grip is turned in one direction to apply one of said bands and release the other and as it is turned in the other direction to release the one and apply the other.

5. In a motor driven lawn mower, the combination of a main frame, propelling mechanism carried thereon, cutting mechanism at the forward end of said main frame including a cutting blade element rotatable about a transverse axis, a supporting roller mounted on said frame rearwardly of the cutting mechanism including two differentially connected halves, clutch means for said drive means including a clutch drum at the outer end of said half, a brake drum, a clutch band and a brake band on said respective drums, hand operated unitary means for individually operating said respective bands, whereby as one is released the other is engaged, and drive means between said propelling mechanism and said cutting mechanism to operate the latter.

6. In a motor driven lawn mower, the combination of a main frame, propelling mechanism carried thereby, cutting mechanism at the forward end of said main frame, a supporting roller mounted on said frame rearwardly of the cutting mechanism, a shaft journaled in said frame and supporting said roller, a tubular drive shaft mounted on said shaft, drive means between said propelling mechanism and said tubular drive shaft, a hand operated clutch between said drive shaft and said roller and a hand operated slip clutch between said drive shaft and said cutting mechanism for driving the latter.

7. In a motor driven lawn mower, the combination of a main frame, propelling mechanism carried thereby, cutting mechanism at the forward end of said main frame including a cutting blade element rotatable about a transverse axis, a supporting roller mounted on said frame rearwardly of the cutting mechanism, a shaft journaled in said frame and supporting said roller, a tubular drive shaft mounted on said shaft, drive means between said propelling mechanism and said tubular drive shaft, hand operated clutch between said drive shaft and said roller, and drive means for said cutting mechanism including a gear loosely mounted on said drive shaft, and a hand operated slip clutch for connecting and disconnecting said drive shaft to said gear.

8. In a motor driven lawn mower, the combination of a main frame, propelling mechanism carried thereby, cutting mechanism at the forward end of said main frame, means for connecting said cutting mechanism with said propelling mechanism, a supporting roller mounted on said frame rearwardly of the cutting mechanism, a shaft journaled in said frame and supporting said roller, a tubular drive shaft mounted on said shaft, drive means between said propelling mechanism and said tubular drive shaft, planetary gearing between said tubular drive shaft and said roller comprising a gear on said tubular drive shaft, a gear connected to said roller, a drum surrounding said shaft and planetary gears journaled in said drum and meshing with said respective gears of said drive shaft and roller, a clutch band surrounding said drum adapted to hold and release it, and hand operated means for operating said clutch band.

9. In a lawn mower, a main frame, a motor carried thereby, cutting mechanism mounted in said frame, means for connecting said cutting mechanism to said motor, a rotary propelling means connected with said motor, a planetary transmission intermediate said motor and propelling means, a roller, a shaft upon which said roller is mounted, a hollow shaft upon the first mentioned shaft, a sprocket secured upon the hollow shaft, a second sprocket loose upon the hollow shaft, and clutch means intermediate the hollow shaft and last named sprocket.

10. In a lawn mower, the combination of a rotary support to carry the main portion of the weight of the machine, a cutting mechanism disposed in front of said support and including a stationary cutting blade, a ground shoe beneath and supporting the cutting blade and to the rear of the cutting edge of said blade and of substantial length and lying wholly within the path of the cutting means and adapted to act as a front support to carry the remaining weight of the machine, and to gauge the cut, and means to drive the cutting mechanism and rotary support.

11. In a lawn mower, the combination of a rotary support to carry the main portion of the weight of the machine, a cutting mechanism disposed in front of said support and including a stationary cutting blade, a ground shoe beneath and supporting the cutting blade and to the rear of the cutting edge of said blade and of substantial length and lying wholly within the path of the cutting means and adapted to act as a front support to carry the remaining weight of the machine, and to gauge the cut, means to drive the cutting mechanism and rotary support, and means to adjust said mechanism about said shoe to vary the height of cut.

12. In a lawn mower, the combination of a rotary support to carry the main portion of the weight of the machine, a cutting mechanism including a stationary cutting blade, and a ground shoe beneath the cutting blade and located to the rear of the cutting edge of said blade and lying wholly within the path of the cutting means and extending longitudinally of the cutting blade to act as a front support to carry the remaining weight of the machine, and to gauge the cut, adjustable means to hold said cutting mechanism and ground shoe in spaced relation to each other, and means to drive the cutting mechanism and rotary support.

13. In a lawn mower, the combination of a cutter frame, a roll mounted in the rear of said cutter frame for carrying a part of the weight of the machine, a roller support to the rear of said cutting mechanism and of said carrying roll for carrying the major part of the weight of the machine, a gauge shoe of less width than the cut and wholly to the rear of the cutting edge carried by said cutter frame, means for detachably holding said gauge shoe in position whereby gauge shoes of different thicknesses may be used to change the spaced relation of the cutting mechanism to the ground, and means to drive said cutting mechanism and the said roller support.

14. In a lawn mower, the combination of a cutting mechanism comprising a rotary cutting element and a stationary blade, a ground engaging shoe located to the rear of the cutting edge of said blade and wholly within the path of the cutting blade, a support for said cutting mechanism mounted on said shoe and adapted to support the cutting mechanism in spaced relation to the ground, driving means of less width than the cutting mechanism and disposed rearwardly thereof, and means to drive the cutting mechanism and said driving means.

15. In a lawn mower, the combination of a cutting mechanism comprising a rotary cutting element and a stationary blade, a ground engaging shoe located to the rear of the cutting edge of said blade and wholly within the path of the cutting blade, a support for said cutting mechanism mounted on said shoe and adapted to support the cutting mechanism in spaced relation to the ground, driving means of less width than the cutting mechanism and disposed rearwardly thereof, means to drive the cutting mechanism and said driving means, and means to adjust said mechanism about said shoe to vary the height of cut.

16. In a lawn mower, the combination of a main frame, a rotary support to carry the rear end of the main frame, a driving motor, a subframe at the forward end of the main frame, a transverse longitudinally sliding pivot to carry the subframe, a cutting mechanism and gauge roll carried by said subframe, means for driving the cutting means from the motor, means to operate said sliding pivot whereby the subframe is swung about the axis of the cutting reel to maintain the center distance of the sprocket on the cutting reel and the driving sprocket.

17. In a motor driven lawn mower, the combination of a main frame, a rotary support to carry the rear end of the main frame, a subframe at the forward end of the main frame, a transverse longitudinally sliding pivot to carry the subframe, a cutting mechanism and gauge roll carried by said subframe, means to operate said sliding pivot whereby the subframe is swung about the axis of the cutting reel to maintain the center distance of the sprocket on the cutting reel and the driving sprocket and means to drive the rotary rear support and the cutting mechanism.

18. In a motor driven lawn mower, the combination of a main frame, a rotary support to carry the rear end of the main frame, a subframe at the forward end of the main frame, a transverse longitudinally sliding pivot to carry the subframe, a cutting mechanism and gauge roll carried by said subframe, means to operate said sliding pivot whereby the subframe is swung about the axis of the cutting reel to maintain the center distance of the sprocket on the cutting reel and the driving sprocket and means to drive the rotary rear support and the cutting mechanism, and means for positively positioning the subframe.

19. In a motor driven lawn mower, the combination of a main frame carrying a motor to drive the propelling and cutting mechanism, a rotary support for the main frame, a subframe carried on the forward end of the main frame on a transverse longitudinally sliding pivot, a rotary cutting mechanism carried on the subframe on a longitudinal pivot, said cutting mechanism having a carrying gauge to the rear of the cutting element, means to rotate the gauge about the axis of the cutter reel, on the transverse longitudinally sliding pivot of the subframe to change the relation of the cutting edge with the ground and maintain the same relative center distance of the gear on the cutting reel and its driving gears.

20. In a motor driven lawn mower, the combination of a main frame carrying a motor to drive the propelling and cutting mechanism, a rotary support for the main frame, a subframe carried on the forward end of the main frame on a transverse longitudinally sliding pivot, a rotary cutting mechanism carried on the subframe on a longitudinal pivot, said cutting mechanism having a carrying gauge to the rear of the cutting element, means to rotate the gauge about the axis of the cutter reel on the transverse longitudinally sliding pivot of the subframe to change the relation of the cutting edge with the ground and maintain the same relative center distance of the gear on the cutting reel and its driving gears and means to lock the subframe in the desired position.

21. In a motor driven lawn mower, the combination of a main frame, propelling mechanism carried thereby, a subframe carried on the forward part of the main frame by a transverse longitudinally sliding pivot, said subframe carrying a rotary cutting unit and gauge, said gauge to carry the cutting unit the desired distance above the ground, a motor for driving the cutting unit, distance rods to hold the subframe in relation to the main frame on its transverse longitudinally sliding pivot, means to move these distance rods to swing the gauge with the cutter frame around the axis of the rotary cutting element on the transverse longitudinally sliding pivots of the subframe to vary the distance of the cutting element from the ground and maintain the same center distance of the driving gears and the driven gear on the rotary cutter shaft.

22. In a motor driven lawn mower, the combination of a main frame, propelling mechanism carried thereby, a subframe on the forward end of the main frame, a cutter frame on the subframe, a gauge on the cutter frame, pivot means mounting said subframe on the main frame for pivotal movement to swing the gauge around the cutting unit to vary the height of the cutting unit from the ground, said pivot means consisting of pivoted guide blocks at each side of the main frame, longitudinal slots in the subframe to engage said guide blocks, distance rods connecting the main frame to the subframe, means to position these distance rods to fix the angle of the subframe to the main frame which determines the relation of the gauge to the cutter unit and the cutter unit to the ground and maintain the relative center distance of the driving gear and the driven gear on the cutter unit and means to drive the propelling mechanism and cutting unit.

23. In a lawn mower, the combination of a rotary rear support, a cutting mechanism, a gauge forming a front support for said mechanism and disposed to the rear thereof and entirely within the path of the cut, spacing means to hold the cutting mechanism and gauge in longitudinally spaced relation to the rotary rear support, said spacing means including a transverse pivot, means for swinging the gauge and the cutting mechanism on said pivot to determine the distance between the cutting edge and the ground, means to lock the transverse pivot means, and means to drive the cutting mechanism and rotary rear support.

24. In a lawn mower, a rotary rear support and a front support, a rotary cutting mechanism on said front support, said cutting mechanism including a gauge mounted on the axis of said mechanism spacing means to hold the axis of the cutting mechanism and the axis of the rotary rear support in substantially constant spaced relation to each other, locking means in said spacing means for normally preventing the gauge from swinging around the axis of the rotary cutting mechanism and acting to determine the distance of the cutting edge of the mechanism from the ground when locked in the desired position, and drive means between said rotary rear support and said rotary cutting mechanism.

25. In a lawn mower, a rotary rear support and a front support, a rotary cutting mechanism on said front support including a gauge, spacing means to hold the cutting mechanism and rotary rear support in spaced relation to each other, said spacing means including a longitudinal loose pivot and a transverse locking means said spacing means also being adapted to hold the gauge in a fixed relation to the axis of the rotary cutter to determine the distance of the cutting edge from the ground and locking it in the desired position, and drive means for said rotary rear support and rotary cutting mechanism.

26. In a lawn mower, a rotary rear support and a front support, a cutting mechanism on said front support, said cutting mechanism including a gauge, spacing means to hold said cutting mechanism and rotary rear suport in spaced relation to each other, said spacing means including a longitudinally loose pivot and a transverse locking means, said spacing means also being adapted to fix the gauge and cutting mechanism on the transverse pivot to determine the distance of the cutting edge from the ground, means to lock the transverse pivot in the desired position and drive means for said rotary rear support and said cutting mechanism.

27. In a lawn mower, the combination of a cutting mechanism, a ground engaging shoe below and of approximately the same length as the cutting mechanism, to carry the cutting mechanism in spaced relation to the ground, a carrying roll rigid with and to the rear of said cutting mechanism, a rotary support to the rear of said cutting mechanism, ground engaging shoe and carrying roll, means for holding said cutting mechanism, ground engaging shoe and carrying roll in spaced relation to said rotary rear support, locking pivot means to swing said carrying roll and said ground engaging shoe simultaneously to alter the vertical position of the cutting mechanism, and means to drive said cutting mechanism and rotary rear support.

28. In a lawn mower, the combination of a main frame, a transversely and longitudinally pivoted cutter frame carried on the forward end of said main frame, a cutting mechanism carried in the cutter frame and a single gauge roll also carried in said cutter frame and entirely to the rear of said cutting mechanism, said cutting mechanism and gauge roll being held in permanent fixed relation to each other, means to swing the cutter frame and its gauge roll on its transverse pivot to vary the gauge of the cutting mechanism from the ground and locking means for positioning said cutter frame.

29. In a lawn mower, the combination of a cutting element rotatable about a transverse axis, a stationary blade, side frames to hold the rotary blade element and stationary blade in spaced relation to each other, and having openings therein, eccentric bushings adjustable in said openings to form the bearings for shaft ends of rotary blade, flanges on said bushings concentric with the outside of said bushing and eccentric with the blade shaft, means for adjusting and securing the bushings in position for adjustment of the cutter shaft in relation to the stationary blade.

30. In a lawn mower, a main frame, a rotary support under the rear end of the frame, a rotary cutting element under the front end of the frame, a stationary cutting blade cooperating with said element, a ground engaging gauge adjacent said element, a sub-frame in which said element is mounted and rotatable about the axis of said element, means for rotating said sub-frame about said axis, and means for locking the sub-frame in adjusted position.

31. In a lawn mower, a main frame, a rotary support under the rear end of the frame, a rotary cutting element under the front end of the frame, a stationary cutting blade cooperating with said element, a ground engaging gauge adjacent said element, a sub-frame in which said element is mounted and rotatable about the axis of said element, means for rotating said sub-frame about said axis, means for locking the subframe in adjusted position, and a chain drive between said rotary support and said rotary element.

Signed at Bridgeport in the county of Fairfield and State of Connecticut this 4th day of April A. D. 1925.

HENRY J. STEGEMAN.
    SYLVANUS D. LOCKE.